Dec. 15, 1942.   R. S. HOPKINS   2,304,921
PROJECTION APPARATUS
Filed April 13, 1940   2 Sheets-Sheet 2

Roy S. Hopkins
INVENTOR
BY
ATTORNEYS

Patented Dec. 15, 1942

2,304,921

UNITED STATES PATENT OFFICE 2,304,921

PROJECTION APPARATUS

Roy S. Hopkins, Rochester, N. Y., assignor to Eastman Kodak Company, Rochester, N. Y., a corporation of New Jersey Application April 13, 1940, Serial No. 329,559

16 Claims. (Cl. 88—24)

The present invention relates to a projection apparatus and more particularly to an optical projection apparatus of the reflection type and having an angular optical path.

While projection apparatus of the reflection type are well known, such apparatus either make no provision for changing the magnification of the projected image, or require a number of adjustments or movements in order to change the magnification of the projector.

The primary object of the present invention is the provision of a reflection type projection apparatus including an object positioning member, a projection lens member, a screen member, and a reflecting member, three of which members are movable to vary the magnification of the projected image.

Another object of the invention is the provision of a reflection type projector having a lens member, a screen member and a reflecting member, all of which are simultaneously movable to vary and adjust the magnification of the image projected onto the screen member.

A further object of the invention is the provision of a reflection type projector in which the movement of the screen member automatically varies the displacement of the reflecting member with respect to the projection lens and/or the screen member to vary the magnification of the projector which consequently can be housed in a relatively compact casing.

Still another object of the invention is the provision of a reflex projector mounted within a casing having a forwardly inclined top wall and having a screen member movable to various substantially vertical positions, all of which are at a convenient viewing angle to the observer or operator.

A still further object of the invention is the provision of a reflection type projector having a movable screen for varying the displacement from the projection lens and magnification of the image therefrom and including a focusing means between the screen and projection lens so that the projected image will be properly focused upon the screen in any position thereof.

Another object of the invention is the provision of a mounting means for the reflecting member in a reflex projector having a rotatable screen member whereby the displacement of the reflecting member upon rotation of the screen member also varies the angular position of the reflecting member so that the axis of the reflected image is at all times perpendicular to the rotatable screen member.

A further object of the invention is the arrangement of the mounting means for the reflecting member so that the displacement thereof with respect to the projection lens member is greater than its displacement with respect to the screen member whereby the lateral dimension of the projector is smaller than the vertical dimension thereof.

Other and further objects of the invention will be suggested to those skilled in the art by the following description.

The above and other objects of the invention are embodied in an optical projection apparatus of the reflection type having an angular optical path and comprising an object positioning member, a projection lens member associated therewith, a screen member located out of the normal path of said projection lens member, a reflecting member in the path of said projection lens member for directing the image therefrom onto said screen member, mounting means movably supporting three out of four of said members for movement to vary and adjust the magnification of the image projected onto said screen member, and connecting means operatively connected between said three movable members and for simultaneously moving the same to vary and adjust the magnification of the projected image. Compactness of the projector and a convenient viewing angle for the screen member are obtained by displacement of the reflecting member and by inclination of the top wall of the casing or of the optical axis of the projection lens. The said connecting means are arranged so that by mere movement of the screen member the displacement and angular position of the reflecting member are varied and the mount for the projection lens is moved so that the image is focused on the screen member in any position of the reflecting member and screen member.

Reference is hereby made to the accompanying drawings wherein similar reference characters designate similar elements and wherein:

Fig. 4 is a fragmentary section on the line 4—4 of Fig. 1 and showing in detail the connection between the reflecting member and the screen member and between the reflecting member and mounting means therefor.

Figure 1:
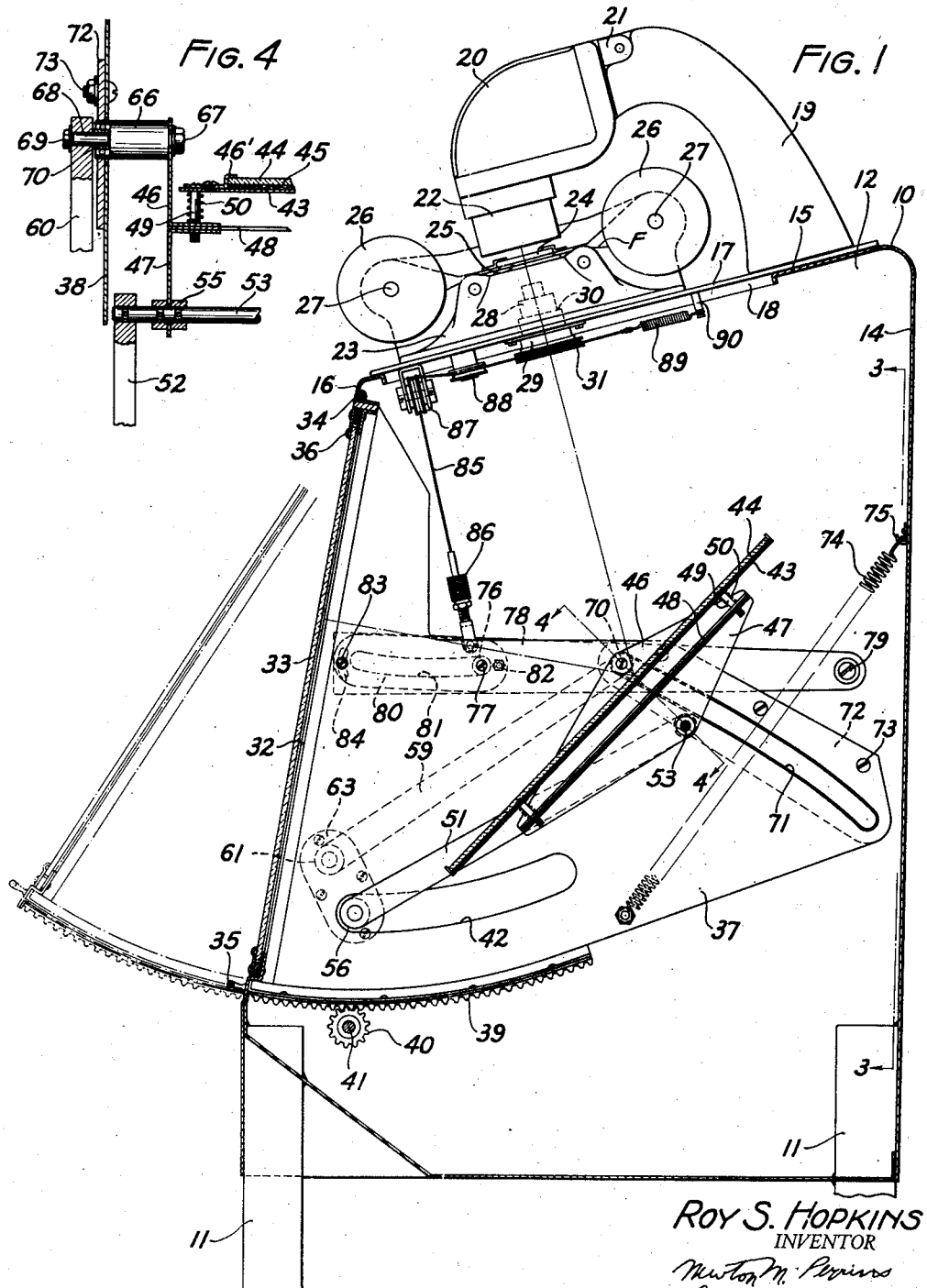
Fig. 1 is a vertical longitudinal section through a reflection type projection apparatus constructed according to the invention.

While the present invention is to be described in relation to a viewing projector or film reader, it is to be understood that the invention is also applicable to projection enlargers or projection printers of the reflection type.

In the illustrated embodiment of the invention, the projection apparatus is mounted on and/or enclosed within a casing 10. Said casing 10 is preferably supported at about waist level from the floor by a plurality of legs 11 and comprises side walls 12 and 13, a rear wall 14, an inclined top wall 15, and a front wall 16 which is provided with a large opening. The top wall 15 is inclined forwardly or toward the front wall 16 of the casing and is preferably at an angle of about 15° to the horizontal.

A top plate 17 is mounted on inclined top wall 15 to cover the flanged opening 18 therein and carries a film handling assembly including an object positioning member or film gate and also carries an illuminating system for the projector. Said illuminating system includes a bracket 19 on top plate 17, a lamp house 20 pivotally connected to bracket 19 by a hinge 21, and a condenser housing 22.

The film handling assembly may be arranged in any well known manner but is preferably constructed as shown in detail in my copending application Serial No. 311,177, filed December 27, 1939, for a Film handling apparatus. Such film handling assembly may comprise a turret member 23 rotatably mounted on the top plate 17 and carrying a pair of glass flats 24 and 25 between which the film F is held or may be moved upon rotation of the film reels 26 by the spindles 27. Said glass flats 24 and 25 are normally pressed toward each other to hold the film F in a flat plane or to form a film gate. The light beam from the lamp house 20 is directed through the glass flats 24 and 25 and the film F therebetween into a projection lens member 28. By reason of the inclination of top plate 17 and top wall 15 the optical axis of said projection lens member 28 is inclined rearwardly within the casing 10 and with respect to its front wall 16.

A focusing mount for the projection lens member 28 may be of any conventional design and may comprise an internally threaded sleeve 29 fastened to the underside of top plate 17 within opening 18 of top wall 15 and engaging a threaded periphery of lens barrel 30 which supports the projection lens member 28 and which has a pulley 31 on the inner end thereof.

It will be understood that rotation of the pulley 31 will vary the axial displacement of projection lens member 28 to change its relative position with respect to the film held between the glass flats 24 and 25 and to focus said projection lens 28.

The screen member for receiving the image projected from the object positioning member through the projection lens is movably mounted within the opening of front wall 16. Such screen member is preferably rotatably mounted and may comprise a frame 32 carrying a suitable translucent screen 33 and pivoted along its upper edge to the casing 10 by a hinge pin 34. A handle 35 is attached to frame 32 to facilitate movement of the screen member about the hinge 34 and a plurality of clips 36 are mounted on frame 32 and overlap the translucent screen 33 to hold it in position within said frame 32.

Figure 2:
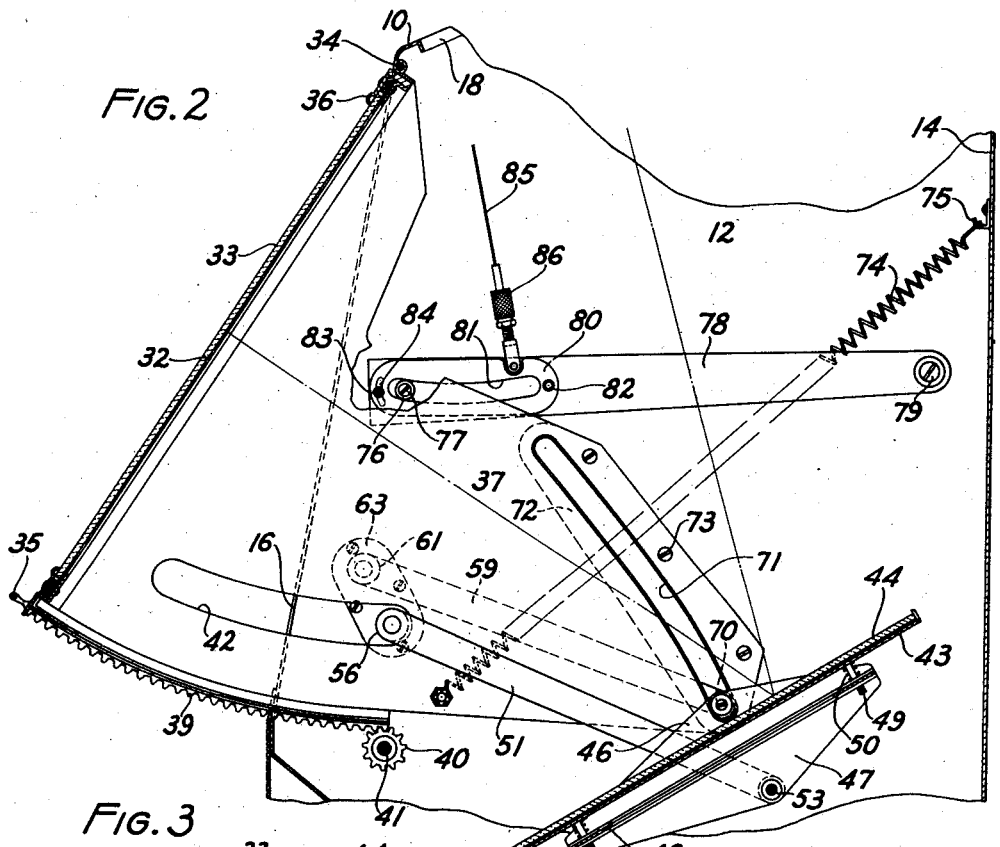
Fig. 2 is a fragmentary longitudinal vertical section through the projector showing the relative change in positions of the reflecting member, screen member, connecting means, and focusing means upon movement of the screen to its extended position.

The screen assembly also includes a pair of side walls 37 and 38 which extend rearwardly from the frame 32 to cover the intervening space between the screen and casing particularly when the screen member is in its extended position as shown in Fig. 2. Said side walls 37 and 38 have their lower edges arcuately formed about the center of hinge pin 34 and carry an arcuate rack 39 meshing with a pinion 40 on a shaft 41 extending transversely of the casing 10. A locking mechanism and/or magnification indicating means (not shown) may be associated with said shaft 41. Said side walls 37 and 38 of the screen member are provided with arcuate slots 42 also having their centers coinciding with the axis of the hinge pin 34.

A reflecting member is placed in the path of the projection lens member for directing the image from said lens onto the screen member and such reflecting member is supported by a mounting means which is movable to vary the displacement and angular position of the reflecting member with respect to the lens and screen members. The reflecting member may comprise a flanged plate 43 carrying a mirror such as a glass plate 44 having a reflecting back 45, see Fig. 4. The mirrored glass plate 44 is held in position on plate 43 by lateral angle brackets 46'.

Figure 3:
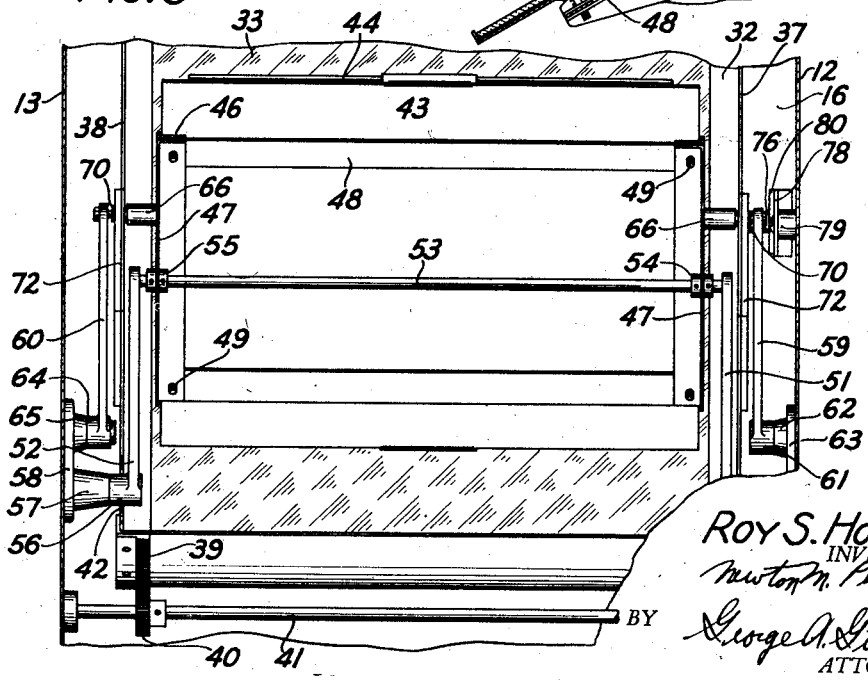
Fig. 3 is a fragmentary transverse section taken on the line 3—3 of Fig. 1 and showing a rear elevation of the screen member, reflecting member, mounting means for the reflecting member, and the focusing means between the screen member and rotatable mount for the projection lens.

The mounting means comprises a support for the reflecting member which is operatively connected to the casing 10 by a pair of lever arms. The mirror support or frame comprises a pair of elongated angle members 46 and 47 at each side of the reflecting member and between which a rectangular frame 48 is fastened. Headed bolts 49 pass through the flanged plate 43 and are threaded into each corner of this supporting frame including angle members 46 and 47 and rectangular frame 48. Coil springs 50 encircle each of the headed bolts 49 between the angle members 46 and 47 and the flanged plate 43 resiliently to support the reflecting member at widely spaced points. By such a mounting arrangement the reflecting member is resiliently supported so that shocks and jars cannot injure the glass plate 44 but is also supported at widely spaced points so that the angular position of the reflecting member is not critically dependent upon the position of its support. Lever arms 51 and 52 are each pivotally connected at their free ends to a transverse rod 53 which carries ball bearing bushings 54 and 55 which are fastened respectively to the angle members 47 at each side of the reflecting member. The other ends of lever arms 51 and 52 are pivotally supported by the side walls of the casing, such as by a boss 56 extending through the arcuate slot 42 in side wall 38 of the screen member and pivotally connected to a collar 57 on a plate 58 attached to side wall 13, see Fig. 3. The lever arms 59 and 60 are pivotally supported from the side walls 12 and 13 of casing 10, a boss 61 on lever 59 being pivotally attached to a collar 62 on plate 63 on side wall 12 and a boss 64 on lever arm 60 being pivotally attached to a collar 65 on said plate 58 attached to side wall 13. The other ends of lever arms 59 and 60 are pivotally connected to the angle members 46 at each side of the reflecting member. For instance, see Fig. 4, a bushing 66 is fastened to angle member 46 by a bolt 67 and has a reduced portion 68 which extends through the end of lever arm 60 and fastened thereto by a bolt 69. A ball bearing collar 70 encircles reduced portion 68 between bushing 66 and lever arm 60. A similar collar 70 is mounted on the reduced portion of the bushing 66 at the other end of the reflecting member, and both of these collars act as followers within the cam slots 71 of the cam plates 72 which are adjustably attached by bolts 73 to the side walls 37 and 38 of the screen member.

It will be understood that by virtue of the pivotal arm mounting means for the reflecting member, the reflecting member may be displaced at various distances from the projection lens member 28. In order to increase the range of magnification of the projector, it is also desirable to vary the displacement between the screen member and reflecting member for increase and decrease of the magnification of the image on the screen member. But since the screen member is rotatably mounted, its displacement with respect to the reflecting member would introduce abnormal conditions such as wedging of the image or throwing part of it out of focus unless the reflecting member is also turned so that the axis of the reflected image is maintained perpendicular to the screen member.

For the purpose of creating such angular movement of the reflecting member during its displacement with respect to the screen member, the lever arms 51 and 52 are not of the same length as lever arms 59 and 60 but lever arms 51 and 52 are longer than lever arms 59 and 60. Also, the spacing between the pivotal connections of the lever arms 51, 52, 59 and 60 to the casing are less than the spacing between the pivotal connections of these same lever arms to the angle members 46 and 47. In other words, as seen in Fig. 1, the pivotal supports for levers 51 and 59 on the side wall 12 of the casing 10 are in a spaced relation which is less than the spaced relation of the pivotal connections of said lever arms 51 and 59 to the angle members 46 and 47. As a result, when the reflecting member is moved from the position shown in Fig. 1 for greater displacement from the projection lens member 28 and to the position of maximum magnification as shown in Fig. 2, the reflecting member is also rotated as well as displaced so that the acute angle between the mirror and the optical axis of the projection lens is increased with increase in displacement from the lens. The unequalities in the lengths of the lever arms, different spacings of the pivotal connections for these arms on the casing and to the reflecting member, and the contour of cam slots 71 are all selected so that the reflecting member is rotated through the same angle as the screen member is rotated and so that the reflected leg of the image beam is always perpendicular to the surface of the translucent screen 33.

The weight of the inner ends of the screen side walls 37 and 38 of the reflecting member and its mounting means acting on the cam on said side walls all contribute normally or by an action of gravity to move the screen member to an extended position. A resilient means is provided for counterbalancing this effect and may be provided as a pair of coil springs 74 each having one end connected to the side walls 37 and 38 of the screen member and the other ends connected to hooks 75 on the rear wall 14 of the casing 10.

In order that the projection apparatus shall not occupy excessive floor space, it is preferred that the increase in the effective displacement between the projection lens and screen member shall be effected more in a vertical direction than in a horizontal direction. In other words, the relative relationship between the reflecting member and screen member is such that the reflecting member is displaced from the projection lens 28 in its movement from minimum to maximum magnification position a distance greater than the reflecting member is displaced with respect to the screen member upon movement from the position of minimum magnification to the position of maximum magnification. By increasing the lens to reflecting member distance more than the reflecting member to screen distance, not only is the design of the projection apparatus rendered more practical by reason of greater height rather than length, but the amount of angular rotation of the screen member is also reduced so that there is less variation in the viewing angle between the eye of the operator and the screen 33.

It should also be noted that as the screen member is rotated away from a vertical position it becomes more difficult to observe and soon reaches an angular position such that it can hardly be observed at all. For the purpose of diminishing the necessary angular movement of the screen member, the top wall of the casing is inclined so that the optical axis of the projection lens extends onto the casing with a rearward inclination, this permits a more nearly vertical position of the screen member at its position of minimum magnification and consequently reduces the angle of the screen to the vertical for maximum magnification. The preferred inclination of the top wall is about 15° and the preferred maximum angle of the screen member to the vertical is less than 45°. In the preferred form the screen member in its retracted or position of minimum magnification is inclined to the vertical 10° and in its extended position or position of maximum magnification makes an angle of 21° to the vertical.

Since the changes in effective spacing or displacement between the projection lens and screen member will throw the image on the screen out of focus, it is quite necessary and desirable that the image shall be automatically focused on the screen for each magnification position thereof. Accordingly, a focusing means is arranged between the screen member and the projection lens. Such a focusing means includes a pivoted arm, an adjustable cam operated by the screen member and a flexible connection from the arm to the rotatable mount for the projection lens. A roller 76 is rotatably mounted on the exterior of side wall 37 of the screen member by means of a bolt 77. An arm 78 is pivoted at one end to the side wall 12 by a pivot 79. A cam member 80 is provided with a cam slot 81 and is pivotally mounted by a bolt 82 at one end to said arm 78. The position of the cam member 80 on arm 78 may be adjusted to correspond to the optical characteristics of various lenses which might be placed in the threaded sleeve 29, one such form of adjustment comprises an arcuate slot 84 and a screw 83 which may be loosened for adjustment of the cam member 80 and tightened to hold the cam member 80 in such adjusted position on the arm 78. A flexible member or string 85 is connected at one end through an adjustable connector 86 to the arm 78, extends over a swivel pulley assembly 87 and a pulley 88 on the undersurface of top plate 17, encircles the pulley 31 on the inner end of lens barrel 30, and is connected at its other end to one end of a coil spring 89 which has its other end attached to a stud 90 also on the undersurface of top plate 17. As the screen member is moved in or out, the roller 76 engaging the cam slot 81 of cam member 80 will rotate the arm 78 about the pivot 79 and the flexible member 85 will be moved to rotate the pulley 31 on lens barrel 30 which will be axially moved in the threaded sleeve 29 for axial adjustment of the projection lens member 28. Obviously, the lead of the threads between sleeve 29 and lens barrel 30 and the contour of the cam slot 81 may be selected so that the image on the screen member will be in focus for all positions thereof.

The operation of the projection apparatus according to the invention will now be briefly described. Assuming that the screen member is in its position of minimum magnification, shown in full lines of Fig. 1, the image from the projection lens 28 will be reflected from the reflecting back 45 of glass plate 44 onto the translucent screen 33 and the image of the film between glass flats 24 and 25 may be observed upon such screen 33. If a greater or different magnification of the image is desired, the handle 35 on the screen member is grasped and the screen member is moved outwardly. The coil spring 74 facilitates such movement of the screen member and associated mechanisms and it will be assumed that the screen member is moved to its extended position, as shown in Fig. 2.

Upon such outward movement of the screen member and of its side walls 37 and 38, the ball bearing collar 70 within cam slots 71 permit the mounting means for the reflecting member to move downwardly for increase of the lens to mirror and mirror to screen distances within the projector. At the same time by reason of the proportioning of the lever arms of the mounting means and unequal spacing of the pivotal connections, the reflecting member is rotated about an angle equal to the angle of rotation of the screen member. Accordingly, there is no distortion of the image reflected onto the translucent screen 33. At the same time the roller 76 on side wall 37 also lowers the arm 78 to create a pull on the flexible member 85 and to rotate the pulley 31 and lens barrel 30 so that the projection lens member 30 is axially moved to maintain its focus on the screen member, the effective displacement of which has been increased.

While it is obvious that equivalent mechanisms may be substituted in the projection apparatus shown, it shall be understood that the present disclosure is merely illustrative and that the scope of the invention is defined by the appended claims.

Having now particularly described my invention what I desire to secure by Letters Patent of the United States and what I claim is:

1. In an optical projection apparatus of the reflection type and having an angular optical path, the combination with a casing, a stationary object positioning member thereon, a projection lens member associated with and movable with respect to said object positioning member, a screen member movably mounted on said casing and located out of the normal path of said projection lens member, and a reflecting member movably mounted within said casing in the path of said projection lens member and for directing the image therefrom onto said screen member, of connecting means operatively connected between said projection lens member, said screen member and said reflecting member and for simultaneously moving the same simultaneously to vary and adjust the magnification of the image projected onto said screen member.

2. In an optical projection apparatus of the reflection type and having an angular optical path, the combination with a casing, a stationary object positioning member thereon, a projection lens member associated with said object positioning member, a screen member movably mounted on said casing and located out of the normal path of said projection lens member, and a reflecting member movably mounted within said casing in the path of said projection lens member and for directing the image therefrom onto said screen member, of a connecting means operatively connected between said screen member and said reflecting member and for simultaneously moving the same simultaneously to increase or to decrease the magnification of the image projected onto said screen member.

3. In an optical projection apparatus of the reflection type having an angular optical path, the combination with an object positioning member, a projection lens member associated therewith, a screen member located out of the normal path of said projection lens member, and a reflecting member in the path of said projection lens member and for directing the image therefrom onto said screen member, of movable mounting means for said projection lens member, said screen member, and said reflecting member, and connecting means operatively connected between said lens member, screen member and reflecting member and arranged simultaneously to move said screen member and said reflecting member to increase or decrease the magnification of an image on said screen and proportionately to move said projection lens for proper focusing of the image on said screen.

4. In an optical projecting apparatus of the reflection type, the combination with a casing provided with a lateral opening and having a top wall inclined downwardly toward said opening, a projection head on said top wall and including a projection lens with its axis perpendicular to said inclined top wall, a screen member mounted within the lateral opening of said casing and movable to various relatively upright positions, a reflecting means movably mounted in said casing and for directing an image from said projection lens to said screen member, and connecting means between said screen member and said reflecting means and for moving said reflecting means to positions corresponding to the positions of said screen member.

5. In an optical projection apparatus of the reflection type having an angular optical path, the combination with a casing having a wall provided with an opening, a film handling assembly on said casing and including a film gate, a projection lens associated with said gate and for projecting an image therefrom into said casing, and a screen member rotatably mounted on said casing within said opening and out of the normal field of said projection lens, of a reflecting member bodily movable in said casing toward and away from both said lens and screen member, and for directing an image from said projection lens onto said screen member, and mounting means between said casing and said reflecting member and for bodily moving said reflecting member simultaneously to change the angular position of said reflecting member and the displacement thereof from said projection lens.

6. In an optical projection apparatus of the reflection type having an angular optical path, the combination with a casing having a wall provided with an opening, a film handling assembly on said casing and including a film gate, a projection lens associated with said gate and for projecting an image therefrom into said casing, and a screen member rotatably mounted on said casing within said opening and out of the normal field of said projection lens, of a reflecting member in said casing and for directing an image from said projection lens onto said screen member, mounting means on said casing and operatively connected to said reflecting member and for rotating the same into an angular position corresponding to its displacement from said projection lens, and a connection operatively arranged between said screen member and said reflecting member and for moving the same into an angular position so that the light reflected therefrom is substantially perpendicular to said screen member.

7. In an optical projection apparatus of the reflection type, the combination with a casing having a wall and provided with an open side, an object positioning member on said casing, a projection lens, a rotatable mount on said wall, supporting said projection lens in operative relation to said object positioning member, and for moving said lens axially when said mount is rotated, a screen member rotatably mounted in the open side of said casing and located out of the normal path of said projection lens, and a reflecting member in the path of said projection lens and for directing the image therefrom onto said screen member, of a focusing means between said screen member and said rotatable mount including a pivoted arm operatively connected to said screen member for movement thereby and a flexible member connected at one end to said arm and encircling said rotatable mount to turn the same for focusing of said lens upon movement of said screen member.

8. In an optical projection apparatus of the reflection type, the combination with a casing having a wall and an open side, an object positioning member on said casing, a projection lens, a rotatable mount on said wall, supporting said projection lens adjacent said object positioning member and for moving said lens axially when said mount is rotated, a screen member movably mounted in the open side of said casing, located out of the normal path of said projection lens, and carrying a projection, and a reflecting member in the path of said projection lens and for directing the image therefrom onto said screen member, of a focusing means between said screen member and said rotatable mount, including an arm pivoted to said casing and carrying a cam member adjustable on said arm to a position corresponding to the characteristics of said projection lens and operatively engaged by the projection on said screen member, and including a flexible member connected at one end to said arm and encircling said rotatable mount to turn the same for focusing of said lens upon movement of said screen member.

9. In an optical projection apparatus of the reflection type, the combination with a casing having a top wall and a plurality of side walls one of which is provided with an opening, an object positioning member on said casing, a projection lens, a rotatable mount on said wall, supporting said projection lens in operative relation to said object positioning member, and for moving said lens axially when said mount is rotated, a screen member rotatably mounted in the opening in said casing and for receiving an image from said projection lens, of a connecting means between said screen member and said rotatable mount, including an arm pivoted on said side wall of said casing, an operative connection between said screen member and said arm for proportionately moving said arm upon movement of said screen member, and including a flexible member having one end connected to said arm, its other end connected to a spring on said casing, and an intermediate portion encircling said rotatable mount.

10. In an optical projection apparatus of the reflection type, the combination with a casing, a projection lens on said casing, a screen member rotatably mounted on said casing for movement to a plurality of angular positions, and a reflecting member within said casing and for directing an image from said lens onto said screen, of a mounting means between said casing and said reflecting member and supporting said reflecting member for rotation through an angle corresponding to the angular movement of said screen member, and connecting means between said screen member and said reflecting member for varying the angular positions of said reflecting member equally with change in the angular position of said screen member.

11. In an optical projection apparatus of the reflection type, the combination with a casing, a projection lens on said casing, a screen member rotatably mounted on said casing for movement to a plurality of angular positions, and a reflecting member within said casing and for directing an image from said lens onto said screen, of a mounting means between said casing and said reflecting member, supporting said reflecting member for displacement and rotation with respect to said lens and said screen member, and arranged so that upon movement of said reflecting member its displacement with respect to said lens varies more than its displacement with respect to said screen member, and connecting means between said screen member and said reflecting member for varying the displacement and angular positions of said reflecting member, said change in angular position being equal to the change in angular position of said screen member.

12. In an optical projection apparatus of the reflection type, the combination with a casing having walls and an open side, an object positioning member on said casing, and a projection lens member associated therewith, of a reflecting member, and movable mounting means therefor including a pair of lever arms both pivoted in spaced relation at one end to a wall of said casing and both pivoted in a different spaced relation at the other end to said reflecting member so that relative displacement of said reflecting member with respect to said projection lens also changes the angular position of said reflecting member.

13. In an optical projection apparatus of the reflection type, the combination with a casing having walls and an open side, an object positioning member on said casing, and a projection lens member associated therewith, of a reflecting member, and movable mounting means therefor including a pair of lever arms both pivoted in spaced relation at one end to a wall of said casing and both pivoted in a greater spaced relation at the other end to said reflecting member so that increase or decrease of displacement of said reflecting member with respect to said projection lens respectively increases or decreases the acute angle between said reflecting member and the axis of said projection lens.

14. In an optical projection apparatus of the reflection type, the combination with a casing having walls and an open side, an object positioning member on said casing, and a projection lens member associated therewith, of a reflecting member, and movable mounting means therefor including a pair of lever arms of unequal length and both pivoted in spaced relation at one end to a wall of said casing and both pivoted in a greater spaced relation at the other end to said reflecting member so that increase or decrease of the displacement of said reflecting member with respect to said projection lens respectively increases or decreases the acute angle between said reflecting member and the axis of said projection lens.

15. In an optical projection apparatus of the reflection type, the combination with a casing having side walls and provided with an opening, an object positioning member on said casing, a projection lens member associated therewith, a screen member rotatably mounted on said casing for movement within said opening and including a side wall, and a reflecting member within said casing, carrying a follower, and for directing an image from said lens through said opening, of a mounting means between said casing and said reflecting member for rotating said reflecting member as it is displaced with respect to said lens member, a cam member on the side wall of said screen member, operatively engaging said follower for causing displacement and rotation of said reflecting member as said screen member is moved, and arranged to vary the angle of said reflecting member an amount equal to the angular movement of said screen member.

16. In an optical projection apparatus of the reflection type, the combination with a casing having side walls and provided with an opening, an object positioning member on said casing, a projection lens associated therewith, a screen member rotatably mounted on said casing for movement within said opening and including a side wall, and a reflecting member within said casing, carrying a follower, and for directing an image from said lens through said opening, of a mounting means between said casing and said reflecting member for rotating said reflecting member as it is displaced with respect to said lens member, a cam member on the side wall of said screen member, operatively engaging said follower and for causing displacement of said reflecting member such that its angular movement is equal to the angular movement of said screen member, and a resilient means connected between said screen member and said casing and for counterbalancing the screen member and reflecting member to facilitate movement thereof.

ROY S. HOPKINS.